United States Patent
Frenger et al.

(10) Patent No.: US 10,098,055 B2
(45) Date of Patent: Oct. 9, 2018

(54) SYSTEM INFORMATION DISTRIBUTION IN MULTI-OPERATOR SCENARIOS

(71) Applicant: Telefonaktiebolaget L M Ericsson (publ), Stockholm (SE)

(72) Inventors: Pål Frenger, Linköping (SE); Erik Eriksson, Linköping (SE); Martin Hessler, Linköping (SE); Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 14/411,129

(22) PCT Filed: Oct. 2, 2014

(86) PCT No.: PCT/SE2014/051141
§ 371 (c)(1),
(2) Date: Dec. 24, 2014

(87) PCT Pub. No.: WO2016/053155
PCT Pub. Date: Apr. 7, 2016

(65) Prior Publication Data
US 2016/0262088 A1    Sep. 8, 2016

(51) Int. Cl.
*H04W 48/12* (2009.01)
*H04W 74/08* (2009.01)

(52) U.S. Cl.
CPC ....... *H04W 48/12* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 7,920,536 B1* | 4/2011 | Kunz | ................... | H04W 74/02 370/338 |
| 9,462,539 B2* | 10/2016 | Frenger | ............... | H04W 74/006 |
| 2004/0110503 A1* | 6/2004 | Park | ........................ | H04W 8/08 455/435.1 |

(Continued)

FOREIGN PATENT DOCUMENTS

WO    2013077783 A1    5/2013

OTHER PUBLICATIONS

Frenger, Pål et al., "From Always Available to Always Optimized, Towards 5G-5Green system design", Ericsson PowerPoint presentation, available online at URL:http://wireless.kth.se/5green/wp-content/uploads/sites/19/2014/08/2014-08-27-Pal-Frenger-5green-summer-school-Part-2-Fromalways-available-to-always-optimized-final.pdf, Aug. 27, 2014, 1-28.

*Primary Examiner* — Xavier Szewai Wong
(74) *Attorney, Agent, or Firm* — Murphy, Bilak & Homiller, PLLC

(57) ABSTRACT

Methods and apparatus are disclosed for distributing access information in a multi-operator scenario. In a multi-operator network (100), network nodes (130, 140, 150) are configured to transmit one or more system signatures and one or more access information tables. A terminal device (200) can use a received system signature to retrieve a set of system information from an access information table. The retrieved system information is used by the terminal device (200) to initiate a random access procedure to gain access to an operator network.

31 Claims, 10 Drawing Sheets

(56) References Cited

U.S. PATENT DOCUMENTS

| | | | |
|---|---|---|---|
| 2007/0230600 A1* | 10/2007 | Bertrand | H04J 13/00 375/260 |
| 2008/0134327 A1* | 6/2008 | Bharrat | H04L 63/1458 726/22 |
| 2009/0042582 A1* | 2/2009 | Wang | H04W 74/0866 455/450 |
| 2010/0002590 A1* | 1/2010 | Park | H04W 74/006 370/241 |
| 2015/0288495 A1* | 10/2015 | Tiirola | H04W 24/10 370/329 |
| 2015/0341950 A1* | 11/2015 | Pang | H04W 72/1263 370/329 |

* cited by examiner

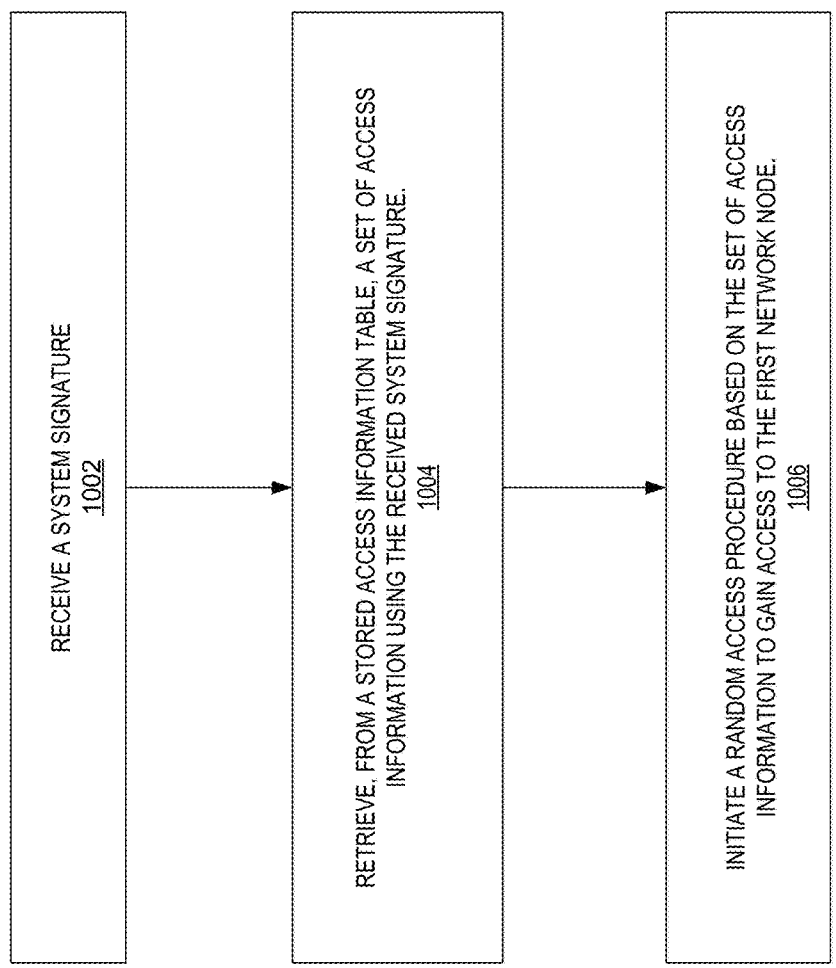

SYSTEM INFORMATION DISTRIBUTION IN MULTI-OPERATOR SCENARIOS

TECHNICAL FIELD

The present invention relates generally to system information distribution, and, more specifically, to providing access information to terminal devices located in a multi-operator scenario.

BACKGROUND

In a typical radio communications network, a network node periodically transmits, e.g., by using a broadcast transmission format, cell-specific reference signals, synchronization signals, and system information. The transmitted system information may include uplink and downlink cell bandwidth, parameters related to random-access transmission and uplink power control, etc. The system information provides the necessary information for a terminal device to gain access to the network node and to operate properly within the network.

In some wireless systems, system information is broadcast as System Information Blocks (SIBs) on a Downlink Shared Channel (DL-SCH) as often as every 10 ms. Periodic broadcast of system information and transmission of associated channel demodulation and synchronization signals may lead to inefficient energy performance, especially when the size of a SIB is large and the transmission duration of a SIB is long. In such case, energy consumption due to periodic transmissions of SIBs becomes significant.

Further, network nodes owned by different operators may be configured to transmit, e.g., broadcast, different system information. In this way, a terminal device, based on the different system information, can distinguish one operator's network from another operator's network and select an appropriate cell to connect to. However, in the latest wireless technology development, highly integrated deployment has become an important objective. In the current technology, to make a third party network appear to be an integral part of an operator network, the third party network needs to broadcast the Public Land Mobile Network Identifiers (PLMN IDs) of that operator network and the demodulation and synchronization signals of that operator network. This generates heavy interference, especially when the third party network is part of dense indoor networks, raising the overall energy consumption by the indoor networks.

SUMMARY

The present disclosure relates to system information distribution.

In some embodiments, a wireless communication system comprises two network nodes. The first network node is identified by a first network identifier and the second network node is identified by a second network identifier different than the first network identifier. The first network node is configured to transmit a system signature. The second network node is configured to transmit an access information table that links the system signature transmitted by the first network node with a first set of access information. The system signature transmitted by the first network node can be used by a terminal device to retrieve the first set of access information from the access information table.

In some embodiments, a first network node is configured to distribute access information associated with a second network node. The first network node generates an access information table comprising an entry that links a system signature to a set of access information. The set of access information can be used to gain access the second network node. The generated access information table is transmitted to one or more terminal devices.

In some embodiments, a terminal device is configured to gain access to a first network node affiliated with a first operator with which the terminal device has no subscription. The terminal device receives a system signature. For example, the system signature may be broadcast by the network it is currently associated with. The terminal device is configured to retrieve, from a stored access information table, a set of access information using the received system signature. The set of access information provides information needed to gain access to the first network node. Based on the set of access information, the terminal device initiates a random access procedure towards the first network node.

The methods and apparatus disclosed herein provide a simple and seamless approach to integrate a small third party network (TPN) into a large operator network. The TPN owner may deploy its own network first using an unlicensed spectrum band. At a later stage, the TPN owner may make an agreement with an operator to integrate the TPN network with the operator network. By managing and controlling how access information is distributed among terminal devices, the operators and the TPN owners can control the behavior of their affiliated terminal devices without additional overhead.

BRIEF DESCRIPTION OF THE DRAWINGS

FIG. 10 illustrates an exemplary method for gaining access to a network node by a terminal device.

In the attached drawings, like reference numerals designate corresponding similar parts. The features of the illustrated embodiments can generally be combined unless they clearly exclude each other. The embodiments depicted in the drawings are examples only.

DETAILED DESCRIPTION

Figure 1:
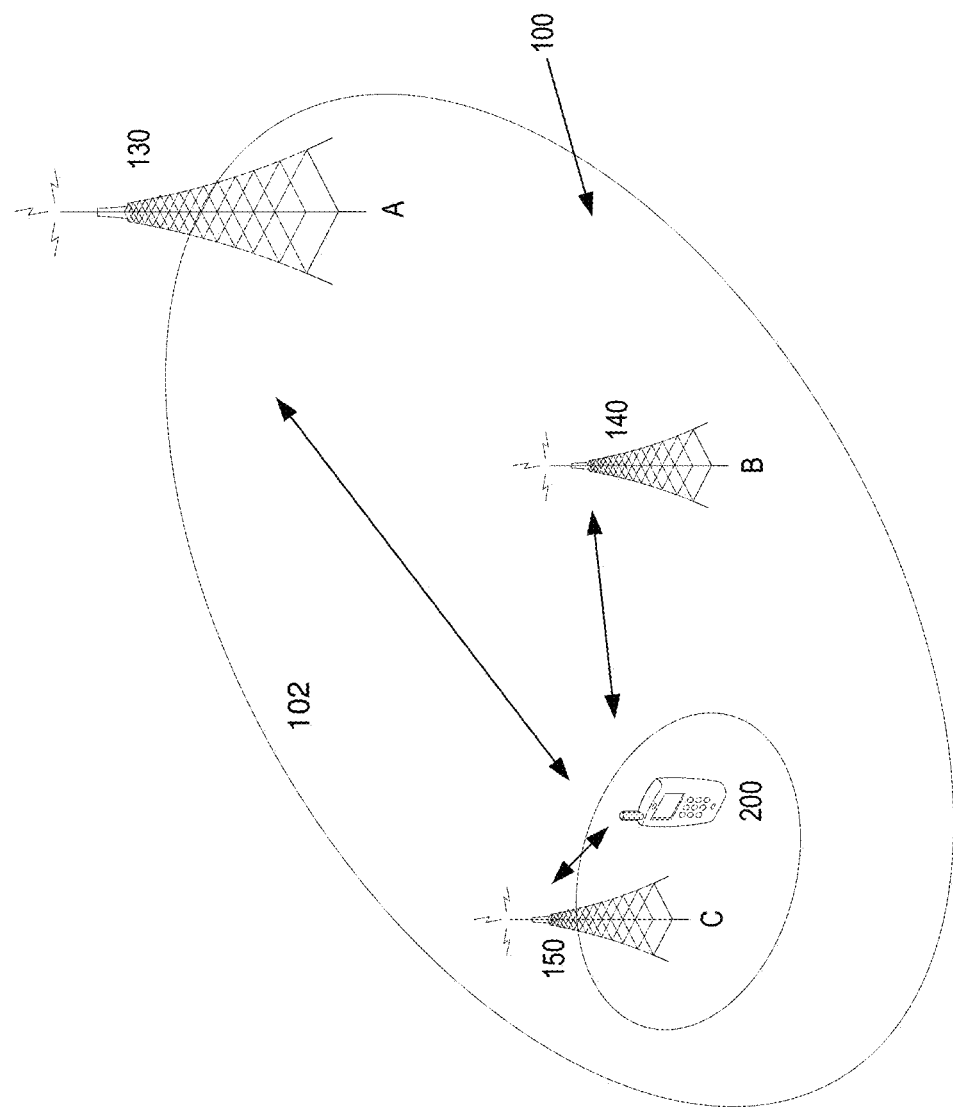
FIG. 1 illustrates an exemplary multi-operator radio communications scenario.

Referring to FIG. 1, a geographic area 100 is covered by a network operated by Operator A (herein referred to as Network A), a network operated by Operator B (herein referred to as Network B), and a Third Party Network (TPN) operated by Entity C (herein referred to as TPN C). Network A includes one or more network nodes 130. Network B includes one or more network nodes 140 and Network C includes one or more network nodes 150. It is noted that as an example, only one network node is shown to be associated with each network in FIG. 1 and only one network node in each network is described in the description below. However, each network may include more than one network node.

In FIG. 1, a terminal device 200 is depicted as located inside the area 100 covered by the multiple networks (Network A, B, & C). In some embodiments, Network A and/or Network B are cellular networks operated by cellular operators. Generally, a cellular operator provides necessary infrastructure to deliver wireless communication services using licensed radio spectrum. Each cellular operator is identified by a Public Land Mobile Network Identifier (PLMN ID). All network nodes operated by the same cellular operator may be identified by the same PLMN ID of the operator. In some embodiments, TPN C may be operated by owners of a hotel, a mall, a train, a stadium, an enterprise, or the like. Such venue owners normally provide their own Wireless Local Area Network (WLAN) to their customers because cellular operators often don't have the permission to install cellular network equipment inside the venue. TPN C may be associated with a network identifier and all network nodes belonged to TPN C may be identified by the same network identifier.

In FIG. 1, the terminal device 200 is located in the area 100 covered by three networks A, B, and C. The terminal device 200 continuously performs cell searches and tries to find a cell with the strongest signal, e.g., the cell provided by the network node 150. The terminal device 200 then determines the physical-layer cell identity of the cell provided by the network node 150. When the cell identity is determined, the terminal device 200 attempts to acquire system information transmitted by the network node 150.

In this disclosure, system information is also referred to as access information and may include one or more parameters that control the timing, frequency, transmission formats, and power to be used by the terminal device 200 to perform random access procedures in order to gain access to the network node 150. Similarly, a system information table may also be referred to as an access information table in this disclosure.

Access information is generally broadcast by a network node repeatedly, in the format of, for example, Master Information Blocks (MIBs) or System Information Blocks (SIBs). Frequent and repetitive transmissions of MIBs or SIBs are energy consuming. Instead of transmitting access information directly, the present application discloses that a new signal, herein referred to as system signature ("SS"), may be transmitted. In FIG. 1, each network node, 130, 140, and 150, is assigned a different system signature. However, in some embodiments, the same system signature may be assigned to two or more network nodes. In some embodiments, upon receiving a system signature from a network node, the terminal device 200 looks up an access-information table to retrieve the access information corresponding to the received system signature signal. The retrieved access information provides the necessary parameters for initiating a random access procedure by the terminal device 200 to gain access to the network node.

An access information table provides a mapping between different system signatures and different sets of access information. In some embodiments, an access information table may include one or more entries with each entry mapping a system signature to a set of access information. An entry in a table may refer to a row in a conventional table, a piece of data, or simply an item of information. An access information table may be provided by infrequent broadcasting, e.g., every 10.24 seconds. An access information table may also be transmitted to or stored at a terminal device during configuration or system set-up. For example, an access information table may be hardcoded on a Subscriber Identity Module (SIM) card, or provided together with the terminal device's firmware or operating system software. The access information table may also be explicitly defined in a standard.

In some embodiments, the system signature may be e.g. a 10-bit index. In the present disclosure, "system signature" and "index" may be used interchangeably. In some embodiments, each system signature is associated with a set of access information and the association is included in an access information table. A network node, e.g., the network node 130, 140, or 150, continuously broadcasts an index that represents the access information needed to gain access to the node. The terminal device 200 receives the index that is broadcast by the network nodes and looks it up in an access information table. The terminal device 200 retrieves from the access information table the access information associated with the index. The access information is then used by the terminal device 200 to initiate a random access procedure.

In some embodiments, each access information table is associated with or identified by a network identifier. The network identifier may be a PLMN ID or a network identifier associated with a third party network. The network identifier associated with an access information table indicates the operator to which the access information table belongs. The network identifier is used by a terminal device 200 to determine which access information table(s) is associated with the operator with which the terminal device 200 has a subscription.

In some embodiments, an access information table may contain a plurality of entries. Each entry may be identified by or associated with a network identifier that indicates the operator to which the entry belongs. The terminal device 200 uses the network identifier associated with each entry to determine which entry in the access information table belongs to the operator with which the terminal device 200 has a subscription.

In some embodiments, two access information tables may map a same system signature to different sets of access information. For example, in FIG. 1, the access information table provided by Operator A and the access information table provided by Operator B may contain a same system signature but the system signature is mapped to different sets of access information. Two terminal devices belonging to subscribers of Operator A and Operator B respectively may receive the same system signature but may retrieve different sets of access information from the different access information tables provided by the two operators. This opens up for a terminal device specific interpretation of what a received system signature means. This also provides a useful tool for integrating TPN C into the large operator controlled network A or B. For example, the system signature used by the network node 150 in TPN C is different from the system signature(s) used by the network nodes in Network A. The access information table used in Network A can be extended to include the system signature used by the network node 150 in TPN C. In this way, the network node 150 can appear to be part of Network A to terminal devices that have subscription with Operator A, as described in detail in FIG. 2.

Figure 2:
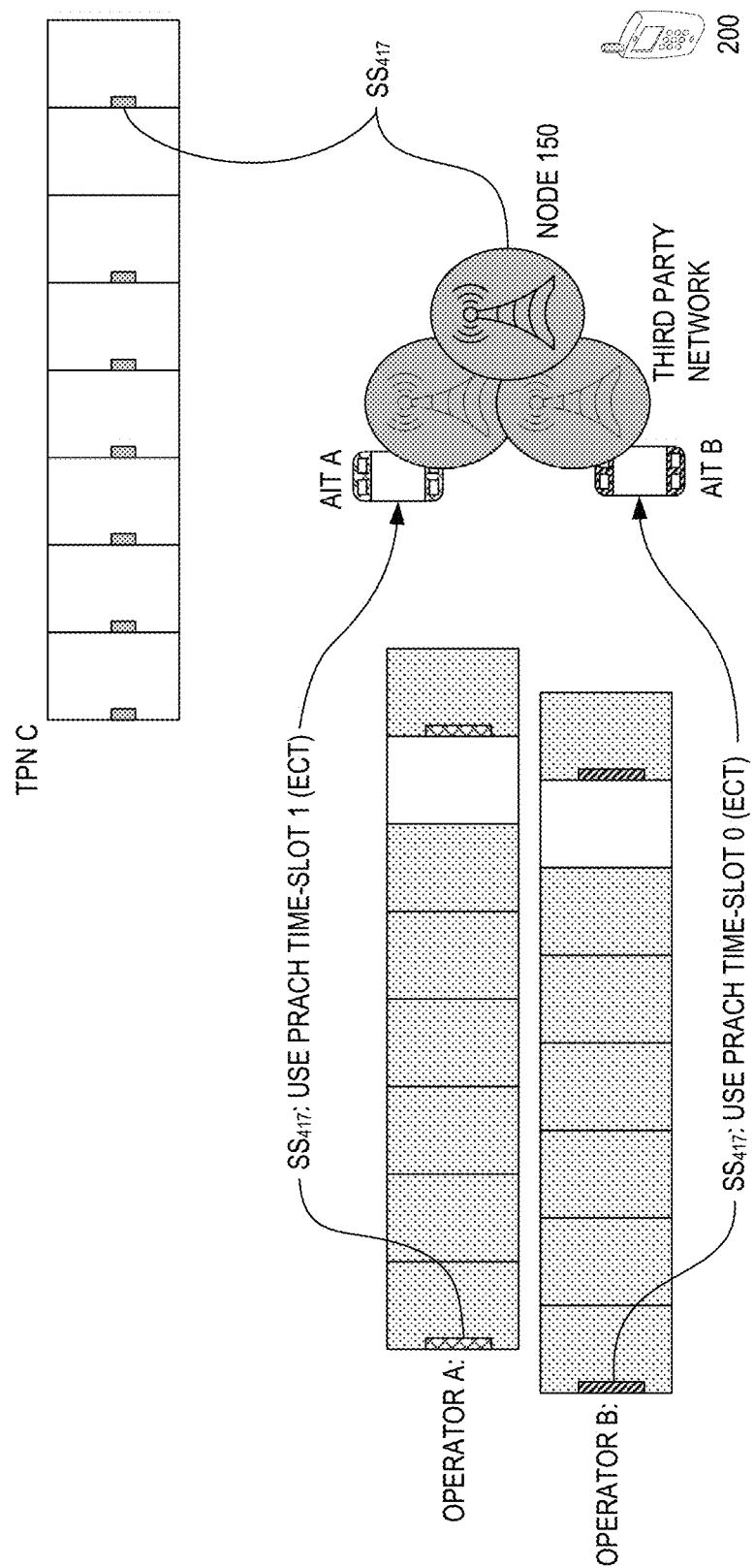
FIGS. 2-6 illustrate different embodiments of distributing access information in a multi-operator scenario.

In FIG. 2, Operator A and Operator B each provide an access information table (AIT), AIT A and AIT B respectively. For identification purposes, AIT A is identified by a Public Land Mobile Network Identifier (PLMN ID) associated with Operator A and AIT B is identified by a PLMN ID associated with Operator B. In both tables, an entry is included for the system signature $SS_{417}$, which is a system signature broadcast by the network node 150 in TPN C. In table AIT A, the system signature $SS_{417}$ is associated with a set of access information that specifies time-slot 1 on Physical Random Access Channel (PRACH) as random access time slot. In table AIT B, the system signature $SS_{417}$ is associated with a different set of access information that specifies time slot 0 on PRACH as random access time slot. A terminal device 200 receives the system signature $SS_{417}$ transmitted by the network node 150 in TPN C. The terminal device 200 also receives table AIT A from Network A and table AIT B from Network B. The AIT A is identified by the PLMN ID of Network A. The AIT B is identified by the PLMN ID of Network B. Because the terminal device 200 has a subscription with Operator A, the terminal device 200 looks up in table AIT A and finds an entry that matches the system signature $SS_{417}$ received from the network node 150 in TPN C. The entry specifies a set of access information and the set of access information indicates that the random access time slot is time slot 1 on PRACH. Using the set of access of information, the terminal device 200 can initiate a random access procedure to gain access to the network node 150 in TPN C in the random access time slot (time slot 1) on PRACH. To the terminal device 200, the network node 150 in TPN C appears to be an integral part of Network A.

Similarly, for a terminal device that has subscription with Operator B, the network node 150 in TPN C may appear to be part of Network B if table AIT B includes an entry linking the system signature $SS_{417}$ to the set of access information that can be used to gain access to the network node 150 in TPN C.

In FIG. 2, to integrate TPN C into Network A, the network node 130 in Network A updates its access information table to include a system signature for TPN C, which is broadcast by the network node 150. Alternatively, the network node 150 may choose to broadcast system signatures that are already included in the access information table, AIT A or AIT B, as shown in FIG. 3.

Figure 3:
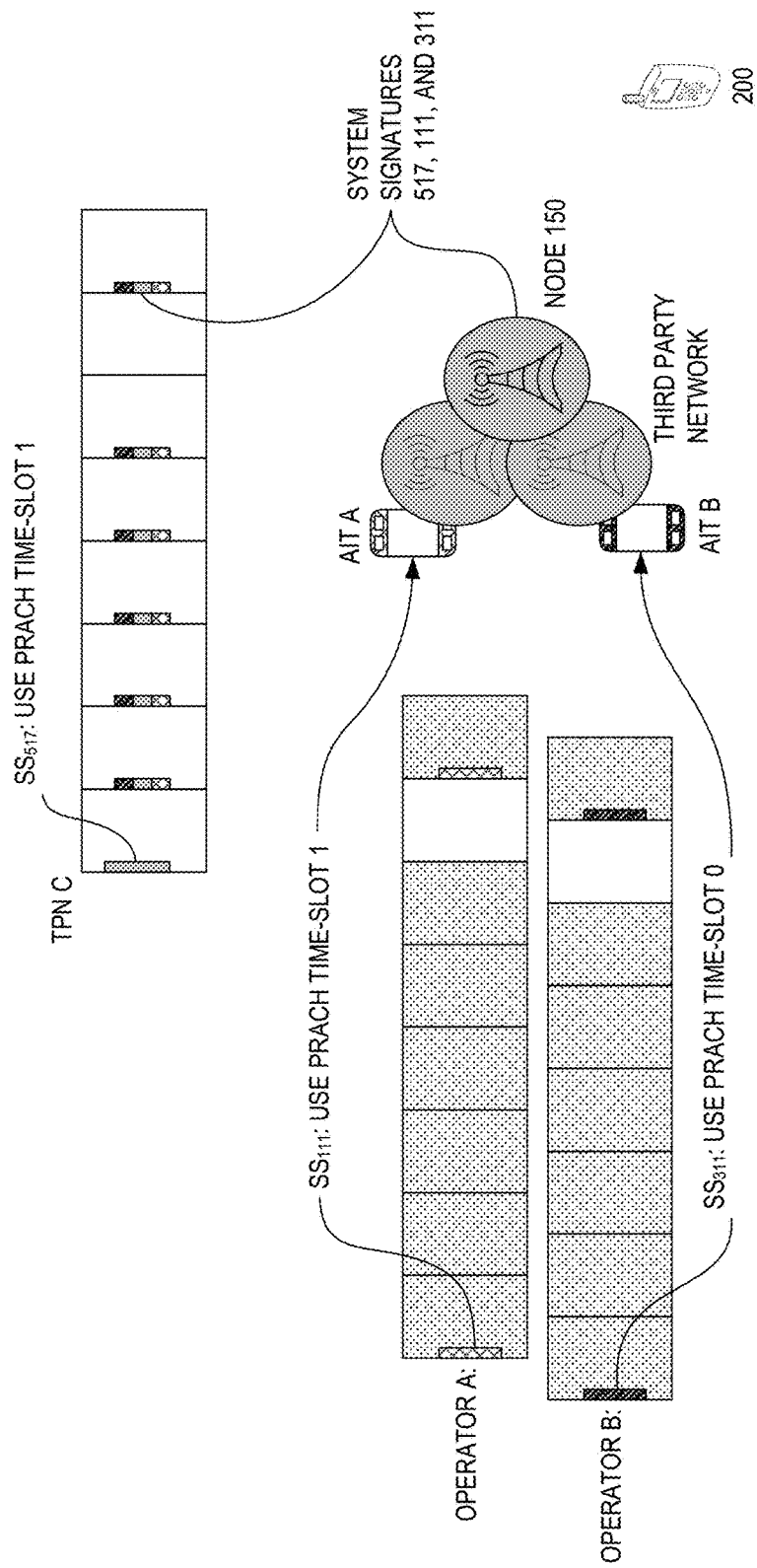

In FIG. 3, the network node 150 in TPN C is configured to transmit three system signatures, $SS_{517}$, $SS_{111}$, and $SS_{311}$. Among the three system signatures, $SS_{517}$ is a system signature associated with TPN C. The other two system signatures are associated with a network other than TPN C. Table AIT A, the access information table associated with Network A, contains an entry for $SS_{111}$, which specifies necessary access information needed to gain access to the network node 150. Table AIT B, the access information table associated with Network B, contains an entry for $SS_{311}$, which also specifies the access information needed to gain access to the network node 150. For a terminal device 200 that has subscription with either Network A or Network B, the terminal device 200 can access the network node 150 after it receives either $SS_{111}$, or $SS_{311}$.

In some embodiments, an access information table provides a useful tool for an operator to control when a terminal device 200 can access a third party network. Operator A may simply remove or add an entry that links a system signature to the access information required to initiate a random access procedure towards the network node 150. For example, if the TPN C is congested, the entry of $SS_{111}$ can be removed from AIT A. Afterwards, the terminal device 200 cannot find any access information needed to gain access to the network node 150. The terminal device 200 cannot initiate a random access procedure and will not be able to move from Network A to TPN C. In some embodiments, Operator A can add, in the access information table or in an entry in the access information table, an indication to indicate that the network node 150 is barred. When a network node is indicated as barred in the access information table, the terminal device 200 will refrain from accessing the network node 150. Operator A can remove the bar, for example, when the network node 150 is no longer congested, to allow the terminal device 200 to access the network node 150 again. Through the access information table, Operator A can control when terminal devices in its network can move into TPN C, e.g., to achieve load balance. For example, Operator A can prevent terminal devices from entering into TPN C if TPN C is already congested or if there is plenty of un-utilized capacity in Network A.

In some embodiments, Operator A may, for example, provide layer-selection parameters as part of the access information in the access information table. The layer-selection parameters can be used by the terminal device 200 when selecting between different kinds of nodes in a network (e.g., layer selection in a heterogeneous network) and thereby be in control of when the terminal device 200 is allowed to attach to the nodes in TPN C and when it should select to attach to the nodes operated directly by Operator A.

In some embodiments, an access information table may provide a useful tool for the TPN owner to provide continued services when a terminal device affiliated with the TPN moves temporarily into the coverage of Network A or Network B. For example, the TPN owner can configure the network node 150 to transmit a system signature associated with Network A and/or Network B, as shown in FIG. 4.

Figure 4:
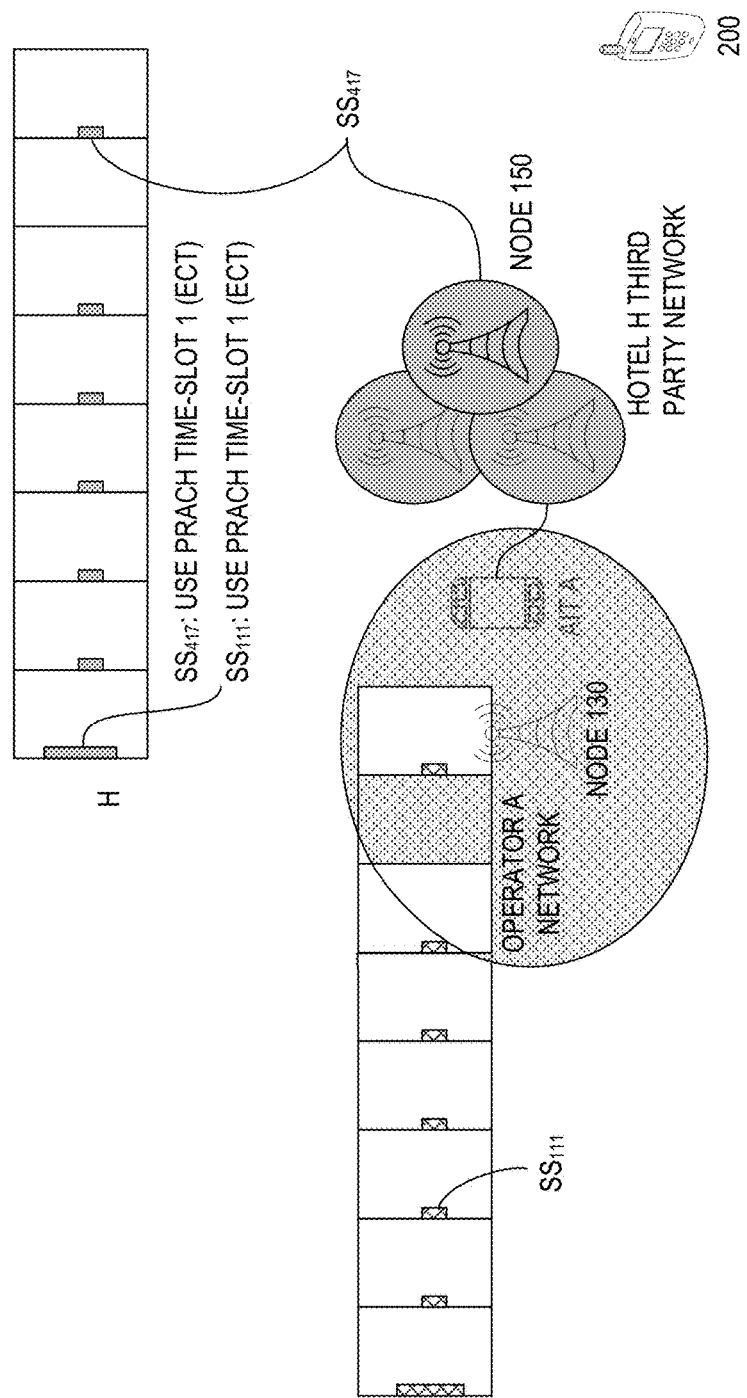

In FIG. 4, the network node 150 in TPN C provided by Hotel H broadcasts the system signature $SS_{417}$ and an access information table AIT C that includes two entries, one for $SS_{417}$ and one for $SS_{111}$. The network node 130 in Network A broadcasts the system signature $SS_{111}$. A terminal device can gain access to Network A, using $SS_{111}$ received from the network node 130 in Network A and the access information table received from the network node 150 in TPN C.

In FIG. 4, the access information table broadcast by TPN C includes the system signature $SS_{111}$ associated with Network A as well as the system signature $SS_{417}$ associated with TPN C. When a terminal device 200 moves from TPN C into Network A, the terminal device receives the system signature $SS_{111}$ transmitted by Network Node 130. The terminal device finds an entry in the access information table AIT C that links $SS_{111}$ to a set of access information. The terminal device retrieves the access information and initiates a random access procedure to gain access to the network node 130 in Network A. In this way, the terminal device receives continued coverage even when he has moved out of TPN C provided by the hotel. As such, a Hotel H customer, subscribed to the hotel's TPN network (e.g., a WLAN network or a 5G network), can remain connected when he is outside the hotel in an area that is not within the coverage of Hotel H's network but is within that of Network A.

Figure 5:
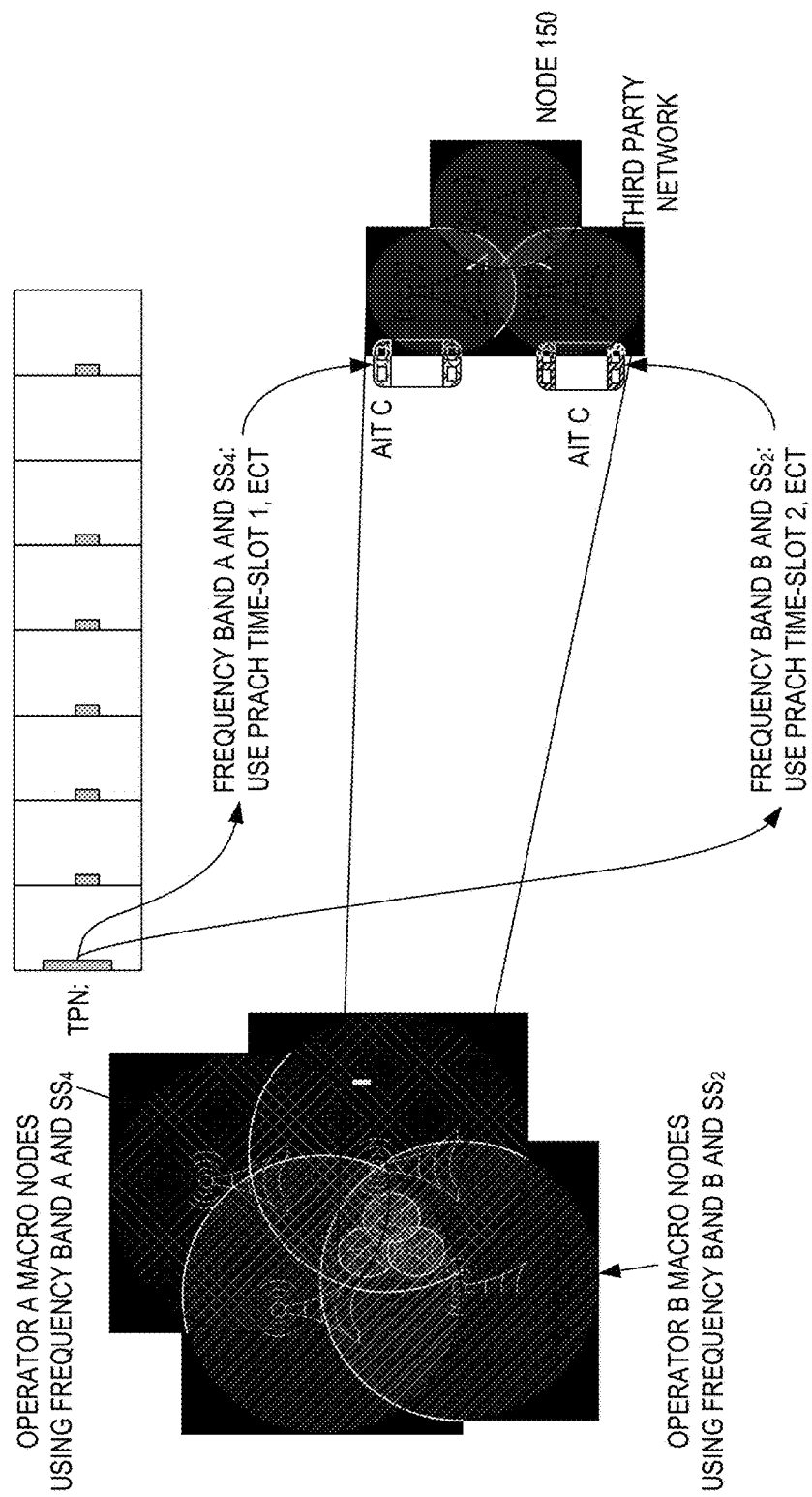

In the above described embodiments, the access information tables and the entries in the access information tables are not operator specific. In some embodiments, an access information table may contain entries associated with different operators. In such access information table, each entry in the table is operator-specific and is associated with a particular operator. As shown in an exemplary embodiment in FIG. 5, TPN C is located within an overlapped coverage area between Network A and Network B. The network node 150 continuously broadcasts the TPN system signature and one or more access information tables. The access information table broadcast by the network node 150 (AIT C) includes an Operator-A specific entry and an Operator-B specific entry. The Operator-A specific entry describes that the system signature $SS_4$ is transmitted in frequency band A and that the system signature $SS_4$ is linked to a set of access information that directs a terminal device 200 to use time slot 1 on PRACH to initiate a random access procedure. The Operator-B specific entry describes that the system signature $SS_2$ is transmitted in frequency band B and that the assigned random access time slot is time slot 2 on PRACH. Note that an AIT entry is considered to be operator specific if the actual table entry is relevant only for terminal devices with a subscription with that specific operator. For example, the AIT entry contains a PLMN ID of that specific operator or is otherwise identified by a network identifier of that operator. In a similar manner an entire AIT is considered to be operator specific if it is only relevant for terminal devices with a subscription with that specific operator. For example, the AIT may contain a PLMN ID of that specific operator in the table header. Only terminal devices that have subscription with that specific operator can use or should use the access information table.

Figure 6:
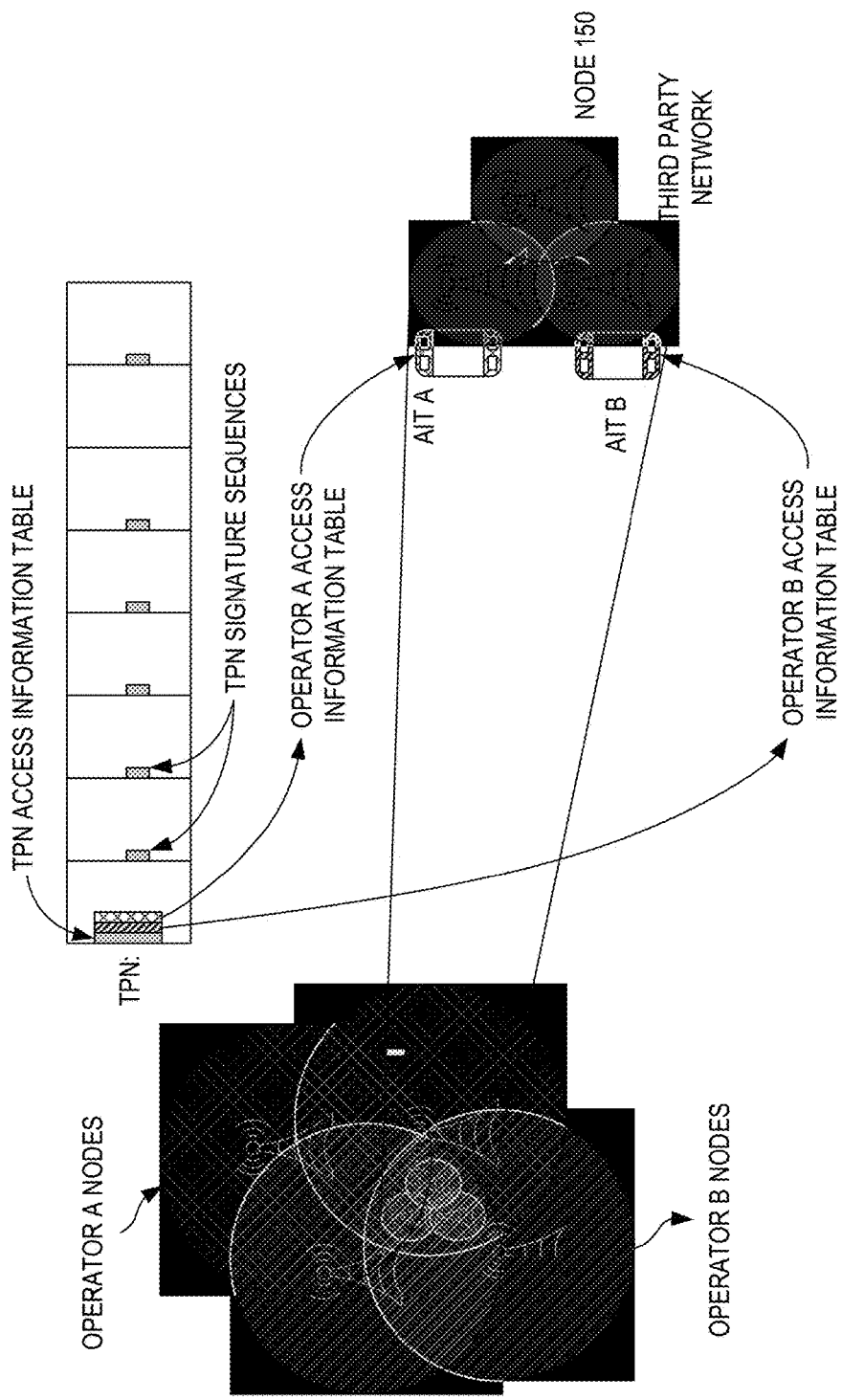

For example, FIG. 6 illustrates an embodiment in which operator-specific AITs are used to distribute access information. In FIG. 6, the network node 150 in TPN C broadcasts multiple access information tables, each associated with an operator with whom it has a collaboration agreement. In FIG. 6, TPN C is shown to be located within an overlapped coverage area between Network A and Network B. The network node 150 continuously broadcasts the TPN system signature. With typically less frequency, the network node 150 also broadcasts three access information tables, table AIT A, table AIT B, and the TPN access information table. The tables may be identified by the PLMN ID included in the table header of each table. For example, table AIT A may include the PLMN ID of Operator A and table AIT B may include the PLMN ID of Operator B. TPN C may be an unlicensed network and may not have a PLMN ID. In such case, TPN C may be identified by a network identifier, such as a Service Set Identifier (SSID). A terminal device having a subscription with Operator A will disregard table AIT B and the TPN access information table, and relies on table AIT A only for retrieving access information.

In FIG. 6, the operator of TPN C has an agreement with both Operator A and Operator B, which allows the network node 150 in TPN C to broadcast table AIT A and table AIT B specific to Operator A and B respectively.

Figure 7:
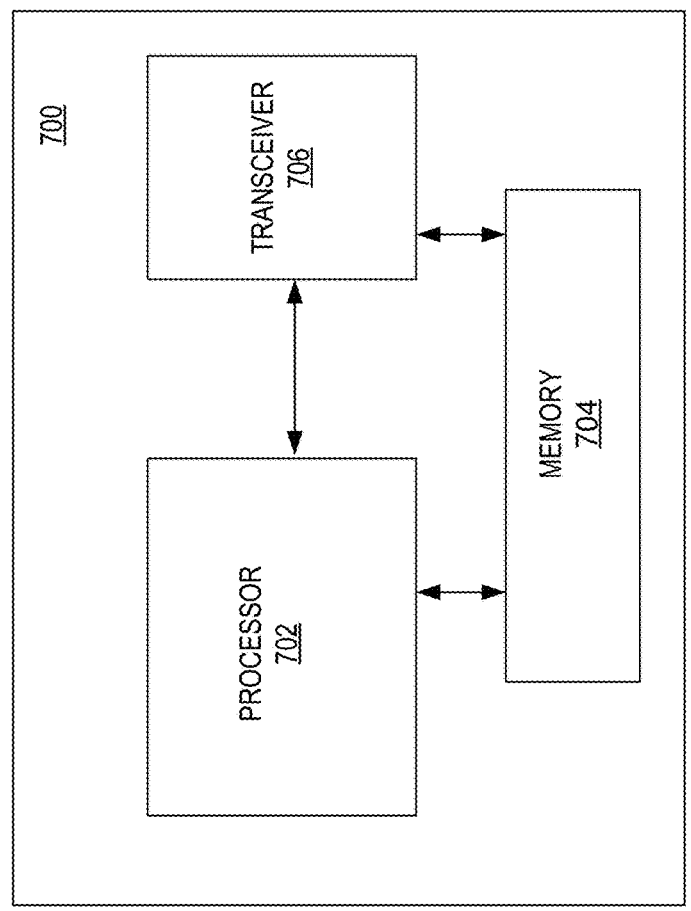
FIG. 7 illustrates an exemplary network node configured to transmit access information in accordance with the methods and techniques disclosed in the present application.

FIG. 7 depicts an exemplary network node 700 configured to perform the methods and techniques described above. The network node 700 may be identified by a network identifier. The network node 700 is operative to generate an access information table and transmit the access information table to one or more terminal devices.

In FIG. 7, the network node 700 comprises a processor 702, memory 704 and a transceiver 706. The memory 704 is configured to store data, for example, access information tables and other subscription data. The memory 704 is also configured to store executable computer instructions. The processor 702 is configured to read the stored data and the computer instructions from the memory 704 and execute the instructions. When being executed, the instructions cause the processor 702 to generate an access information table that comprises an entry linking a system signature to a set of access information that can be used to access another network node, e.g., a second network node. In some embodiments, the entry may be identified by the network identifier of the second network node. In some embodiments, the access information table may be identified by the network identifier of the second network node. In some embodiments, the processor 702 is configured to update the access information table to remove the entry linking the system signature to the set of access information associated with the second network node. After a terminal device 200 receives the updated access information table, the terminal device 200 can no longer retrieve, from the updated access information table, the access information that can be used to access the second network node. In this way, the network node 700 can control whether the terminal device 200 may access network nodes operated by another operator. In some embodiments, the processor 702 is configured to generate another access information table identified by a third network identifier.

Figure 8:
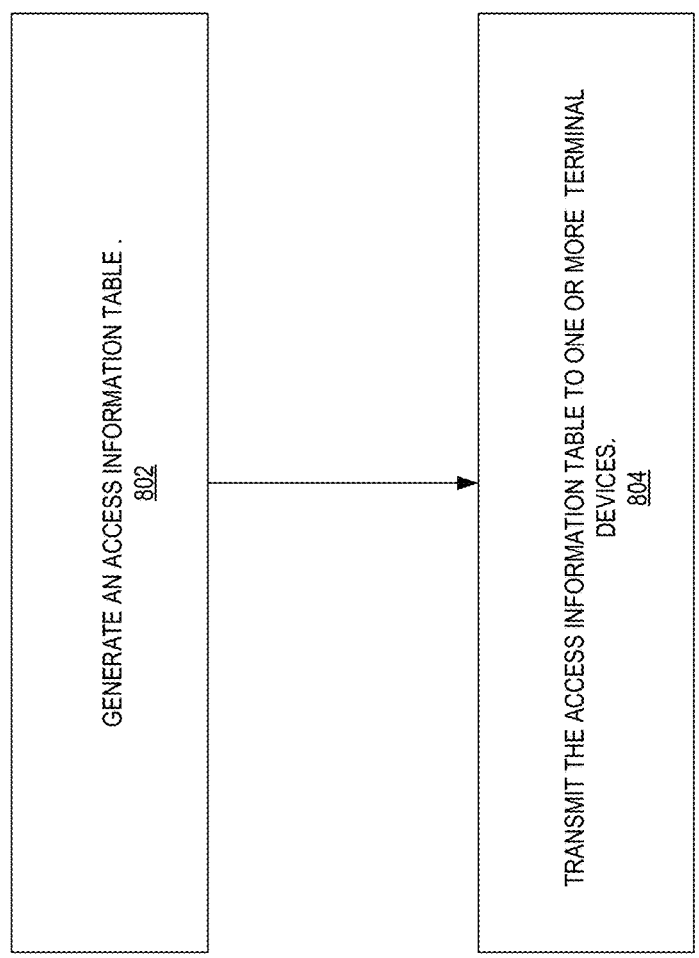
FIG. 8 illustrates an exemplary method for distributing access information.

FIG. 8 illustrates an exemplary method of distributing, by the network node 700, access information associated with a different network node. In step 802, the network node 700 generates an access information table. The access information table comprises an entry that links a first system signature to a set of access information. The set of access information can be used to access a second network node. The network node 700 and the second network node are identified by different network identifiers. In step 804, the network node 700 transmits the access information table to one or more terminal devices. In some embodiments, the entry in the access information table that links the first system signature to a set of access information is associated with the network identifier of the second network node. In some embodiments, the network node 700 updates the access information table to remove the entry associated with the second network identifier. After a terminal device receives the updated access information table, the terminal device can no longer retrieve the set of access information used to gain access to the second network node.

In some embodiments, the access information table is identified by the network identifier of the second network node. In some embodiments, the network node 700 generates a different access information table that is identified by the network identifier of a third network node.

Figure 9:
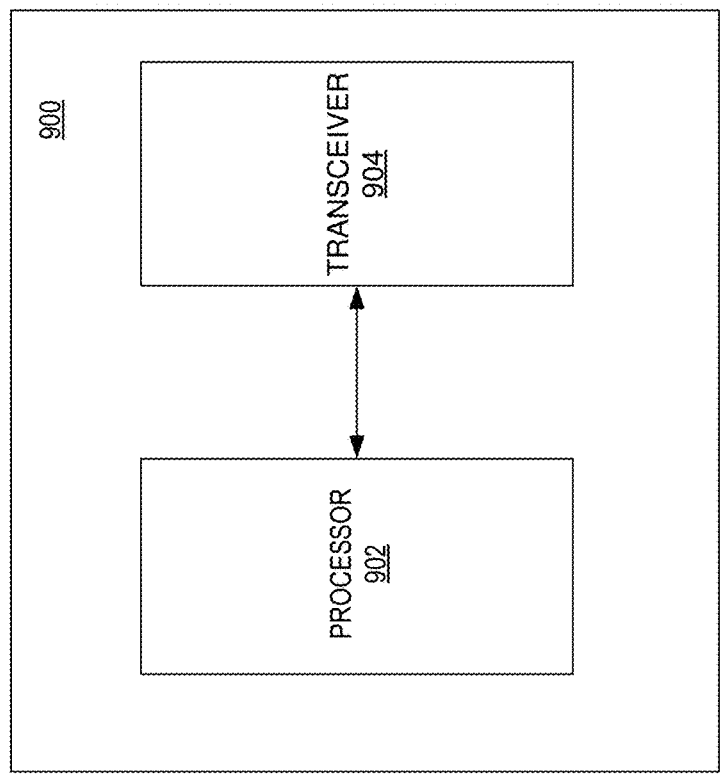
FIG. 9 illustrates an exemplary terminal device configured to retrieve access information in a multi-operator scenario in order to gain access to a network node.

FIG. 9 illustrates an exemplary terminal device 900 configured to perform the methods and techniques described above. The terminal device 900 may comprise a processor 902 and a transceiver 904. The terminal device 900 may further comprise a memory (not shown). The transceiver 904 is configured to receive signals or data from network nodes, e.g., the network node 130, 140, 150, or 700. The processor 902 is configured to retrieve, from a stored access information table, a set of access information using a received system signature. The set of access information provides information needed to gain access to a first network node. The first network node is affiliated with an operator with which the terminal device has no subscription. Although the terminal device has no subscription with the operator, the processor 902 is further configured to initiate a random access procedure based on the retrieved set of access information towards the first network node. In some embodiments, the stored access information table is retrieved from a second network node affiliated with a second operator with which the terminal device has a subscription. In some embodiments, the access information table is pre-stored on a Subscriber Identity Module (SIM) card of the terminal device 900. In some embodiments, the system signature is received from a second network node affiliated with a second operator with which the terminal device has a subscription.

FIG. 10 illustrates an exemplary method implemented by a terminal device 900 for gaining access to the first network node 700. The terminal device 900 receives a system signature (step 1002). The terminal device 900 retrieves, from a stored access information table, a set of access information using the received system signature (step 1004). The terminal device 900 uses the set of access information to initiate a random access procedure based on the set of access information to gain access to the first network node 700 (step 1006). In some embodiments, the stored access information table is retrieved from a second network node affiliated with a second operator with which the terminal device has a subscription. In some embodiments, the access information table is pre-stored on a Subscriber Identity Module (SIM) card of the terminal device 900. In some embodiments, the system signature is received from a second network node affiliated with a second operator with which the terminal device has a subscription.

The above described methods and techniques can be implemented as computer software programs. The above described apparatus such as network nodes and terminal devices can be implemented using one or more processing circuits. The one or more processing circuits may be hard-coded with computer instructions. The one or more processing circuits may be configured to read computer instructions from a storage device (e.g., memory). In both cases, the processing circuits are operative to execute the computer instructions to carry out the processes and methods disclosed herein. In some embodiments, the storage device for storing the computer instructions may be a non-transitory computer-readable medium.

In some embodiments, the above described apparatus may be implemented as computer software. For example, the network node 700 may be implemented as three software modules, a generating module, an updating module and a preparation module. The generating module is configured to generate an access information table comprising one or more entries. Each entry links a system signature to a set of access information that can be used to access a network node identified by a network identifier. The updating module is configured to update the access information table to modify the one or more entries. The preparation module is configured to prepare the access information table for transmission. In some embodiments, the access information table comprises an entry that includes a set of access information for gaining access to a second network node. The second network node is different than the network node 700 that generates the access information table. In some embodiments, the updating module updates the access information table to remove the entry associated with the second network node. After a terminal device receives the updated access information table, the terminal device can no longer retrieve the set of access information used to gain access to the second network node. In some embodiments, the entry that includes access information for the second network node is identified by the network identifier of the second network node. In some embodiments, the access information table may identified by the network identifier of the second network node. In some embodiments, the generating module may generate multiple access information tables. The generating module may generate another access information table that is identified by the network identifier of a third network node.

In some embodiments, the terminal device 900 may be implemented as computer software modules. The terminal device 900 may be implemented as three software modules, a system signature processing module, a retrieving module, and an initiation module. The system signature preparation module is configured to process a received system signature. The retrieving module is configured to retrieve, from a stored access information table, a set of access information using the received system signature. The set of access information provides access information needed to gain access to a first network node. In some embodiments, the first network node is affiliated with an operator with which the terminal device 900 does not have a subscription. The initiation module is configured to initiate a random access procedure based on the set of access information to gain access to the first network node. In some embodiments, the stored access information table is received from a second network node affiliated with a second operator with which the terminal device has a subscription. In some embodiments, the access information table is pre-stored on a Subscriber Identity Module (SIM) card of the terminal device 900. In some embodiments, the system signature is received from a second network node affiliated with a second operator with which the terminal device has a subscription.

The present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

What is claimed is:

1. A method of distributing system information to a terminal device located in an area covered by a first network node and a second network node of a wireless communication system, the terminal device having a subscription with an operator of the second network node, and the method comprising:
transmitting a system signature by the first network node to the terminal device, the first network node being associated with a first network identifier; and
transmitting an access information table by the second network node to the terminal device, the second network node being associated with a second network identifier different than the first network identifier, wherein the access information table is identified by the second network identifier and includes an entry comprising the system signature and an associated first set of access information enabling the terminal device to initiate a random access procedure to gain access to the first network node.

2. The method of claim 1, wherein the system signature transmitted by the first network node is usable by the terminal device to retrieve the first set of access information from the access information table transmitted by the second network node.

3. The method of claim 1, wherein at least one of the first and second network identifiers is a Public Land Mobile Network (PLMN) Identifier.

4. The method of claim 1, further comprising transmitting one or more further access information tables by the second network node, wherein each of the one or more further access information tables is identified by a different network identifier.

5. The method of claim 1, further comprising updating the access information table by the second network node to control how the terminal device gains access to the first network node.

6. The method of claim 5, wherein the updating of the access information table comprises removing the entry comprising the system signature to prevent the terminal device from retrieving the first set of access information using the system signature, thus preventing the terminal device from accessing the first network node.

7. The method of claim 1, further comprising:
transmitting an access information table by a third network node, wherein the terminal device has a subscription with the operator of the third network node, the third network node being associated with a third network identifier different than the first and second network identifiers; and
wherein the access information table transmitted by the third network node is identified by the third network identifier and includes an entry comprising the system signature and an associated second set of access information, different than the first set of access information, enabling the terminal device to initiate a random access procedure to gain access to the first network node.

8. The method of claim 1, further comprising:
evaluating network loading conditions relevant to the first and second network nodes; and
making the second network node available responsive to determining that the first network node is congested and that the second network node is not congested, wherein making available comprises:
initiating the transmission of the access information table by the second network node; and
initiating the transmission of the system signature by the first network node.

9. The method of claim 8, further comprising, subsequent to making the second network node available to the terminal devices, making the second network node unavailable to the terminal devices, based on transmitting an updated access information table in which the entry is removed or marked as barred.

10. The method of claim 9, wherein making the first network node unavailable is responsive to determining that the first network node is congested or the second network node is not congested.

11. A wireless communication system configured to distribute system information to a terminal device located in an area covered by a first and a second network node, the terminal device having a subscription with an operator of the second network node and the wireless communication system comprising:
the first network node associated with a first network identifier, the first network node configured to transmit a system signature to the terminal device; and
the second network node associated with a second network identifier different than the first network identifier, the second network node configured to transmit an access information table to the terminal device, wherein the access information table is identified by the second network identifier and includes an entry comprising the system signature and an associated first set of access information enabling the terminal device to initiate a random access procedure to gain access to the first network node.

12. The wireless communication system of claim 11, wherein the system signature transmitted by the first network node is usable by a terminal device to retrieve the first set of access information from the access information table transmitted by the second network node.

13. The wireless communication system of claim 11, wherein at least one of the first and second network identifiers is a Public Land Mobile Network (PLMN) Identifier.

14. The wireless communication system of claim 11, wherein the second network node transmits one or more further access information tables, and wherein each of the one or more further access information tables is identified by a different network identifier.

15. The wireless communication system of claim 11, wherein the second network node updates the access information table to control how the terminal device gains access to the first network node.

16. The wireless communication system of claim 15, wherein the updating of the access information table comprises removing the entry comprising the system signature to prevent the terminal device from retrieving the first set of access information using the system signature, thus preventing the terminal device from accessing the first network node.

17. The wireless communication system of claim 11, further comprising a third network node associated with a third network node identifier different than the first and second network identifiers, the terminal device having a subscription with an operator of the third network node and the third network node being configured to transmit an access information table, wherein the access information table transmitted by the third network node is identified by the third network identifier and includes an entry comprising the system signature and an associated second set of access information, different than the first set of access information, that is usable by the terminal device to initiate a random access procedure to gain access to the first network node.

18. A method of distributing, by a second network node, access information associated with a first network node to a terminal device located in an area covered by the first and second network nodes, wherein the terminal device has a subscription with an operator of the second network node and the second network node is associated with a second network identifier and the first network node is associated with a first network identifier different from the second network identifier, the method comprising:
generating an access information table identified by the second network identifier, that includes an entry comprising a system signature and an associated set of access information enabling the terminal device to initiate a random access procedure to access the first network node; and
transmitting the access information table to the terminal device.

19. The method of claim 18, further comprising:
updating the access information table to remove the entry comprising the system signature; and
transmitting the updated access information table.

20. The method of claim 18, further comprising generating and transmitting another access information table identified by a third network identifier.

21. A second network node associated with a second network identifier and configured to distribute access information associated with a first network node to a terminal device located in an area covered by the first and the second network nodes, the terminal device having a subscription with an operator of the second network node, the second network node comprising:

a processor configured to generate an access information table identified by the second network identifier that includes an entry comprising a system signature to a and an associated set of access information enabling the terminal device to initiate a random access procedure to access the first network node which is associated with a first network identifier different from the second network identifier; and a transceiver configured to transmit the generated access information table to the terminal device.

22. The second network node of claim 21, wherein the processor is further configured to:

update the access information table to remove the entry comprising the system signature; and transmit the updated access information.

23. The second network node of claim 21, wherein the processor is further configured to generate and transmit another access information table identified by a third network identifier.

24. A method implemented by a terminal device located in an area covered by a first network node and a second network node, for gaining access to the first network node which is affiliated with a first operator with which the terminal device has no subscription, the terminal device having a subscription with an operator of the second network node, wherein the first and second network nodes have overlapping coverage and the second network node is associated with a second network identifier and the first network node is associated with a first network identifier different from the second network identifier, the method comprising:

receiving a system signature;

retrieving, from a stored access information table identified by the second network identifier, a set of access information usable to initiate a random access procedure to gain access to the first network node, wherein the retrieving is based on the received system signature and the second network identifier; and initiating a random access procedure based on the set of access information to gain access to the first network node.

25. The method of claim 24, wherein the stored access information table is received from the second network node.

26. The method of claim 24, wherein the access information table is pre-stored on a Subscriber Identity Module (SIM) card of the terminal device.

27. The method of claim 24, wherein the system signature is received from the first network node.

28. A terminal device configured with a subscription of a second operator operating a second network node, wherein the first and second network nodes have overlapping coverage and the second network node is associated with a second network identifier and the first network node is associated with a first network identifier different from the second network identifier, the terminal device comprising:

a transceiver for receiving a system signature;

a processor configured to:

retrieve, from a stored access information table identified by the second network identifier, a set of access usable to initiate a random access procedure to gain access to the first network node, wherein the retrieve operation is based on the received system signature and the second network identifier; and initiate a random access procedure based on the set of access information to gain access to the first network node.

29. The terminal device of claim 28, wherein the stored access information table is received from the second network node.

30. The terminal device of claim 28, wherein the access information table is pre-stored on a Subscriber Identity Module (SIM) card of the terminal device.

31. The terminal device of claim 28, wherein the system signature is received from the first network node.

* * * * *